United States Patent Office 3,359,296
Patented Dec. 19, 1967

3,359,296
FLUOROALCOHOL CARBONATES
Peter E. Newallis, Morris Plains, Pasquale Lombardo, East Hanover Township, Morris County, and Julian A. Otto, Stockholm, N.J., assignors to Allied Chemical Corporation, New York, N.Y., a corporation of New York
No Drawing. Filed Nov. 13, 1964, Ser. No. 411,131
9 Claims. (Cl. 260—455)

ABSTRACT OF THE DISCLOSURE

Insecticidally active fluoroalcohol carbonates and their preparation by reaction of a fluoroperhaloisopropanol with a chloroformyl chloride, a thionochloroformyl chloride, a chloroformic acid ester or a chloroformic acid thioester.

---

This invention relates to new fluoroalcohol carbonates prepared by reacting a 1,3 hexahalo-2 propanol with a chloroformic acid derivative such as chloroformic acid ester or halide or thioanalog thereof.

The new fluoroalcohol carbonates of our invention are useful as insecticides and particularly as fumigants in the control of both larvae and adults of many insects including the common house fly, meal worms, carpet beetles, and the like.

The new fluoroalcohol carbonates of our invention have the general formula shown below:

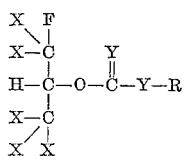

wherein X is chlorine or fluorine; Y is oxygen or sulfur; and R is a lower alkyl radical, an aryl radical, or the radical

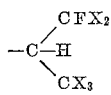

wherein X is fluorine or chlorine.

When the fluoroalcohol carbonates are prepared by the action of a chloroformic acid halide, such as phosgene or thiophosgene, on the fluoroalcohol, two molecules of the fluoroalcohol react with one of the phosgene or thiophosgenes to produce a disubstituted carbonyl compound as shown in the equation below:

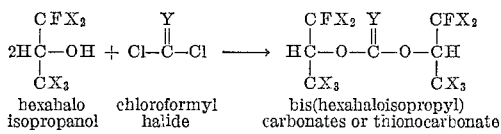

hexahalo    chloroformyl    bis(hexahaloisopropyl)
isopropanol   halide        carbonates or thionocarbonate When the fluoroalcohol carbonates are prepared by the action of a chloroformic ester or thioester on the fluoroalcohol, the compounds react in equimolecular proportions as shown in the equation below:

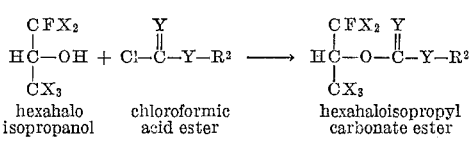

hexahalo    chloroformic    hexahaloisopropyl
isopropanol  acid ester     carbonate ester wherein Y is as defined above, $R^2$ is a member selected from the group consisting of lower alkyl radicals and aryl radicals.

In preparing the new compounds of our invention, the fluoroisopropanol is mixed with a solvent inert to the reaction, suitably diethyl ether, benzene, or acetone, and a hydrogen halide acceptor such as pyridine, an organic amine, such as triethyl amine or an inorganic base such as sodium carbonate, also dissolved or suspended in the inert solvent reaction medium. To this mixture is added, with agitation, an equivalent amount of chloroformic acid ester or halide, preferably while maintaining the temperature of the mixture between about 5° C. and about 15° C. After addition of the reactants is complete, the mixture may be agitated for an additional period if desired, for example, of about one hour at ambient temperatures, although such additional reaction period is usually not necessary.

The solid hydrochloride salt, e.g., pyridine hydrochloride, is separated from the mixture as by filtration, the solvent reaction medium is removed as by distillation, and the product further purified, if desired, by distillation.

The temperature of the reaction is not critical, and the reaction proceeds rapidly at normal room temperatures or below. Since it is usually exothermic, cooling may be desirable. In general, reaction temperatures may conveniently range from about —50° C. to as high as the boiling point of the mixture although higher temperatures do no harm and can range to 200° C. or higher. Preferably, temperatures will be in the range between about 5° C. and about 50° C. Reaction is rapid and is usually complete in a few minutes, for example, not more than about 30 minutes.

Hexahaloisopropanols suitable for use as starting materials in the preparation of our new fluoroalcohols include the following:

1-fluoro-1,1,3,3,3-pentachloro-2-propanol;
1,1-difluoro-1,3,3,3-tetrachloro-2-propanol;
1,1,1-trifluoro-3,3,3-trichloro-2-propanol;
1,1,1,3-tetrafluoro-3,3-dichloro-2-propanol;
1,1,1,3,3-pentafluoro-3-monochloro-2-propanol;
and
1,1,1,3,3,3-hexafluoro-2-propanol.

Chloroformic halides and esters which can be employed in the preparation of our new compounds include phosgene, i.e., chloroformyl chloride, $COCl_2$, thiophosgene, i.e., thiochloroformyl chloride, $CSCl_2$, methyl chloroformate, ethyl chloroformate, propyl chloroformate, butyl chloroformate, pentyl chloroformate, hexyl chloroformate, heptyl chloroformate, octyl chloroformate, and thio-analogs of the foregoing; also phenyl, tolyl and xylyl chloroformates, naphthyl chloroformate, phenyl thio chloroformate, chlorophenyl chloroformate, benzyl chloroformate, 2-chloroethyl chloroformate, chlorohexyl chloroformate, and the like.

The resulting fluoroalcohol carbonates are effective insecticides, and because of their relatively high vapor pressures, are suitable for use as fumigants against numerous insects and their larvae, especially the grain infesting insects such as the various meal worms and flour beetles.

The following specific examples further illustrate our invention. Parts are by weight except as otherwise noted.

*Example 1*

In a 500 ml., three-neck flask, 33.6 grams (0.2 mole) of hexafluoroisopropanol were mixed with 50 ml. of ether. Then 15.5 grams (0.2 mole) of pyridine in 25 ml. ether were added followed by the addition, slowly with stirring and while maintaining the mixture at about 10° C., of 21.7 grams (0.2 mole) of ethyl chloroformate in 25 ml. of ether. The reaction mixture was then filtered to remove pyridine salt and washed with ether. The filtrate was washed twice with water, dried over $MgSO_4$, filtered and distilled, producing 38.5 grams of hexafluoroisopropyl ethyl carbonate

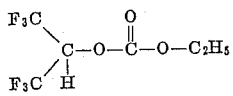

boiling point 104–107° C., in 80% yield showing characteristic carbonyl infrared absorption at 5.6 microns.

Example 2

In to a reaction flask were placed 16.8 grams (0.1 mole) of hexafluoroisopropanol dissolved in 50 ml. ethyl ether. To this solution were added 7.9 grams of pyridine (0.1 mole) in 50 ml. ethyl ether, then, with vigorous stirring, were added 17.3 grams (0.1 mole) of phenyl chlorothiolformate. The reaction mixture, at about 25° C., then was filtered to remove pyridine hydrochloride, which was washed twice with ether. The filtrate was washed twice with water, dried over MgSO₄, and the ether solvent removed in vacuo. The resulting 26 grams (85% yield) of hexafluoroisopropyl phenyl thiol carbonate

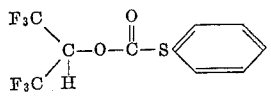

was a yellow oil. It was distilled to produce a 69% yield of a purified oil boiling at 69°–70° C. at 3 mm.

Elemental analyses based on $C_{10}H_6F_6O_2S$ were Calculated, percent: C, 39.5; H, 1.99; S, 10.6. Found, percent: C, 40.01; H, 2.20; S, 9.88.

Example 3

In a reaction flask were mixed 33.6 grams (0.2 mole) hexafluoroisopropanol, 15.8 grams (0.2 mole) pyridine and 100 ml. ethyl ether. To this mixture were slowly added with stirring, a solution of 10 grams (0.1 mole) phosgene in 100 ml. benzene. The reaction was exothermic and the mixture was cooled to maintain a temperature of about 25° C. The mixture was then filtered to remove pyridine hydrochloride salt which was washed with benzene and ether. The filtrate was washed thrice with water, dried over MgSO₄, and distilled. The resulting bis (hexafluoroisopropyl) carbonate

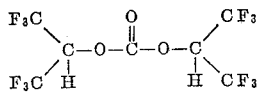

had a boiling point of 97° C. Elemental analysis based on $C_7H_2F_{12}O_3$
Calculated, percent: C, 23.2; H, 0.56. Found, percent: C, 23.28; H, 1.03.

Example 4

In a reaction flask were mixed 33.6 grams (0.2 mole) hexafluoroisopropanol, 15.8 grams (0.2 mole) pyridine, and 100 ml. ethyl ether. The mixture was cooled to 5° C., and then there were slowly added with stirring, a solution of 11.5 grams (0.1 mole) of thiophosgene in 50 ml. anhydrous ethyl ether with ice bath cooling to 5°–15° C. After completion of the addition, the cooling bath was removed, and the resulting mixture was filtered to remove pyridine hydrochloride which was washed twice with ether. The filtrate was distilled yielding 11 grams, 25% yield of purified bis (hexafluoroisopropyl)-thionocarbonate

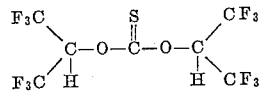

boiling point 104–105° C. Elemental analysis based on $C_7H_2F_{12}O_2S$:

Calculated, percent: C, 22.2; H, 0.53; S, 8.49. Found, percent: C, 22.35; H, 1.05; S, 9.54.

Example 5

In a reaction flask were placed 33.6 grams (0.2 mole) of hexafluoroisopropanol dissolved in 50 ml. of ethyl ether. To this solution were added 15.8 grams (0.2 mole) of pyridine in 50 ml. ether, then slowly with vigorous stirring were added 31.3 grams (0.2 mole) of phenyl chloroformate in 50 ml. ether, at 25° C. The mixture was then filtered to remove pyridine hydrochloride which was washed twice with ether. The filtrate was washed twice with water, dried over MgSO₄, and the ether removed by distillation in vacuo. There resulted 48 grams of hexafluoroisopropyl phenyl carbonate

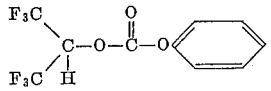

boiling point 37–38° C.

Example 6

The compounds of Examples 1, 2, 3, and 4 were tested as fumigants against house fly pupae by placing 0.05 cc. of the above toxicant compounds on cellucotton wads in gallon jars. Twenty-five house fly pupae, confined in vials stoppered with cellucotton were placed in each jar and the jar sealed. A similar jar containing no toxicant was charged with the same number of house fly pupae. After 24 hours exposure, the test jars and control were examined for number of flies emerged and percent kill with results shown below:

| Sample No. | Compound | No. Flies Emerged | Percent Kill |
|---|---|---|---|
| A | Hexafluoroisopropyl-ethyl carbonate | 0 | 100 |
| B | Hexafluoroisopropyl phenylthiol carbonate | 9 | 64 |
| C | Bis (hexafluoroisopropyl)-carbonate | 0 | 100 |
| D | Bis (hexafluoroisopropyl)-thionocarbonate | 0 | 100 |
| E | No toxicant | 23 | 8 |

Example 7

Tests to determine the effect of hexafluoroisopropyl ethyl carbonate as a toxicant against various insects and larvae were carried out in a manner similar to that described in Example 6 above, except that 0.1 cc. of the toxicant per gallon jar was used, and the organisms were provided with food. Exposure to the toxicant was maintained for 24 hours, and the organisms were observed after six days for percent mortality with the results shown below:

Organism: Percent 6-day mortality
Confused flour beetle adults _____ 100
Lenser meal worm adults _____ 100
Yellow meal worm larvae _____ 100

While the above describes the preferred embodiments of our invention, it will be understood that departures can be made therefrom within the scope of the specification and claims.

We claim:
1. As compositions of matter the fluoroalcohol carbonates of the formula

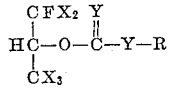

wherein X is a member selected from the group consisting of fluorine and chlorine, Y is a member selected from the group consisting of oxygen and sulfur, and R is a member selected from the group consisting of lower alkyl, aryl, and

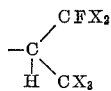

wherein X is as defined above.
2. The compositions of claim 1 wherein Y is oxygen.
3. The compositions of claim 1 wherein Y is sulfur.
4. The compositions of claim 1 wherein R is

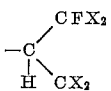

5. Hexafluoroisopropyl ethyl carbonate.
6. Hexafluoroisopropylphenyl thiol carbonate.
7. Bis (hexafluoroisopropyl) carbonate.
8. Bis (hexafluoroisopropyl) thionocarbonate.
9. Hexafluoroisopropyl phenyl carbonate.

References Cited

UNITED STATES PATENTS 3,047,610   7/1962   Brace et al. _____ 260—463
3,226,418   12/1965  Anderson et al. _____ 260—463

CHARLES B. PARKER, *Primary Examiner.*

B. BILLIAN, *Assistant Examiner.*